Figure 1:
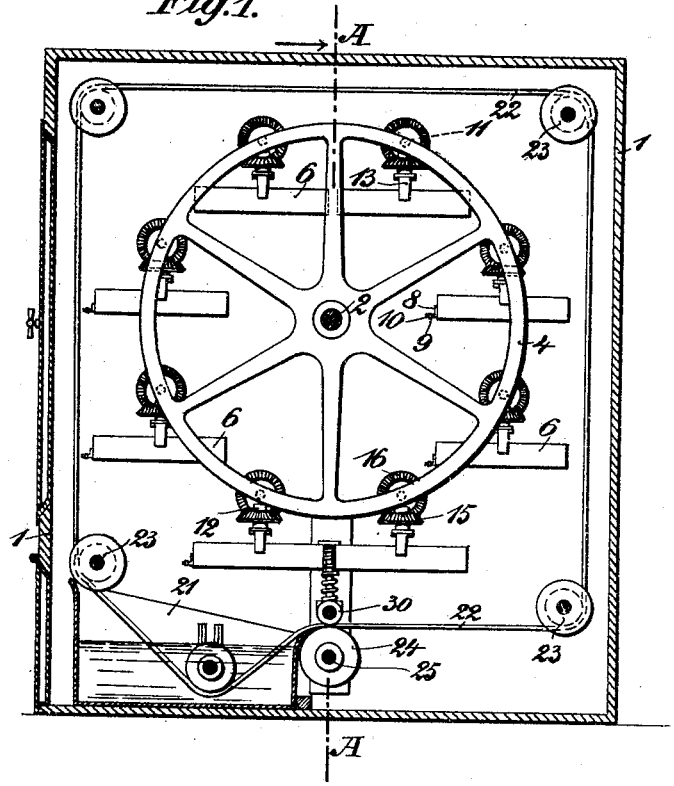

No. 770,967. PATENTED SEPT. 27, 1904.
F. W. IDEN.
INCUBATOR.
APPLICATION FILED DEC. 13, 1902.
NO MODEL. 2 SHEETS—SHEET 1.

Witnesses:
Chas. W. Davids.
J. Mark Pybas

Friedrich Wilhelm Iden,
Inventor;
By his Attorney,
J. R. Littell

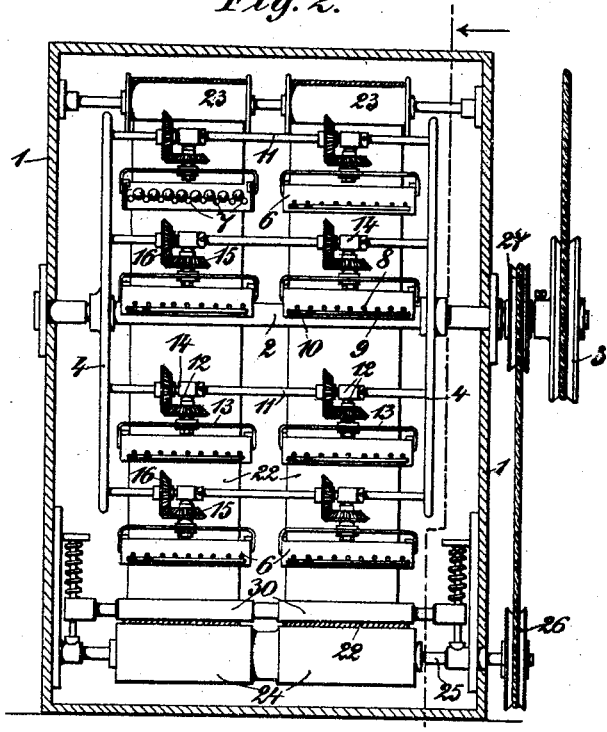

No. 770,967.

Patented September 27, 1904.

UNITED STATES PATENT OFFICE.

FRIEDRICH WILHELM IDEN, OF MARIENDORF, GERMANY, ASSIGNOR OF ONE-HALF TO THE FIRM OF DEUTSCHE THERMOPHOR A.-G., OF ANDERNACH, GERMANY.

INCUBATOR.

SPECIFICATION forming part of Letters Patent No. 770,967, dated September 27, 1904.

Application filed December 13, 1902. Serial No. 135,103. (No model.)

*To all whom it may concern:*

Be it known that I, FRIEDRICH WILHELM IDEN, poultry breeder, a subject of the King of Prussia, Emperor of Germany, residing at Mariendorf, near Berlin, in the Kingdom of Prussia and Empire of Germany, have invented certain new and useful Improvements in Incubators with Egg-Turning Mechanisms, of which the following is a full, clear, and exact description.

The invention relates to improvements in incubators, of which the following is a full and clear description, reference being had therein to the accompanying drawings.

The principal condition of an effective incubator is a uniform distribution of heat and moisture in the hatching-air in order to expose the eggs on all sides to the same moisture and temperature. The devices hitherto used are insufficient for this purpose, and the present invention reaches this aim in another way by giving off the necessary moisture.

In the accompanying drawings, Figure 1 is a section through the hatching-room with the revoluble egg-boxes, in which the eggs are turned by a device which is operated by hand; Fig. 2, a section on the line A A of Fig. 1.

1 is a casing in which a shaft 2 is revolubly journaled. Wheels 4 are keyed to this shaft 2, to which motion is imparted by a rope or belt passing over pulleys 26 27. Between the wheels 4 the egg-boxes 6 are journaled. The egg-boxes 6 consist of frames, in which revoluble rollers 7 are parallelly journaled in equal intervals, so as to form a grate or graduated screen. The rollers 7 are provided at their ends with pins turning in the frames. The rotation of the egg-boxes 6 may be effected in some different way, and the egg-boxes may make at the same time revolutions in several directions. In the modification shown by Figs. 1 and 2 the egg-boxes 6 are suspended in the mode of a swing-boat between the rims 4 and turn loosely around the shafts 11, so that these boxes 6 in consequence of their own gravity are always directing downwardly their under surfaces when the shaft 2 is revolved. In this manner the egg-boxes are continuously traveling through the whole hatching-room. Besides their revolution around the horizontally-journaled shaft 2 the egg-boxes 6 make a second revolution around the pins 12, by means of which the boxes 6 are suspended on the shafts 11. The egg-boxes 6 are supported for this purpose by bails 13, on which the pins 12 are fastened. These pins 12 are formed in one piece with sockets 14, by means of which the suspension to the shafts 11 is effected. A bevel-wheel 15, keyed to the pin 12, meshes with the toothed wheels 16 on the shafts 11. If the shaft 2, with the wheels 4, carrying the egg-boxes 6, is rotated, wheel 15 is rolling on the other wheel 16, turning round itself with the wheel 4, and therefore motion is imparted to the boxes 6, so that these boxes are forced to pass through the whole hatching-room around the shaft 2 and to rotate at the same time around the axis of the suspending-pins 12.

For the purpose of enriching the air introduced into the hatching-room with a certain quantity of moisture a moistening device is arranged in the hatching-room. This device consists of a trough 21, containing water traversed by an endless ribbon 22. This ribbon is conducted over the rollers 23, moved through the hatching-room by means of the roller 24, and pressed at the same time against the roller 24 by the roller 30, which is held downward by a spring. In this manner continuous movement is imparted to the ribbon 22 by the two rollers 24 30. A rope pulley 26 is fastened to the shaft 25 at the outside of the hatching-room, its motion being transmitted to another pulley 27 on the shaft 2 by means of a rope or belt. If, therefore, the shaft 2 is revolved, the shaft 25 is likewise rotated, and simultaneously the moistening-ribbon 22 is advanced through the hatching-room, whereby sufficient moisture is evaporated and communicated to the heated air.

As soon as the chicks are hatched they may be removed to a brooding-room especially built for this purpose.

What I claim, and desire to secure by Letters Patent, is—

1. The combination with an incubator mechanism, of an air-moistening device comprising an endless web, a water-supply, and means for leading said web through said water-supply and the incubator-chamber.

2. A moistening device for incubators, comprising an absorbent belt, a water-supply, means for moving said belt through said water-supply and the incubator-chamber, and combined squeezing and driving rollers engaging said belt.

In witness whereof I subscribe my signature in presence of two witnesses.

FRIEDRICH WILHELM IDEN.

Witnesses:
 HENRY HASPER,
 WOLDEMAR HAUPT.